United States Patent
Misawa et al.

(10) Patent No.: US 6,707,494 B1
(45) Date of Patent: Mar. 16, 2004

(54) SOLID-STATE IMAGE PICKUP APPARATUS FREE FROM LIMITATIONS ON THIN-DOWN READING IN A FOUR-FIELD INTERLINE TRANSFER SYSTEM AND METHOD OF READING SIGNALS OUT OF THE SAME

(75) Inventors: Takeshi Misawa, Asaka (JP); Kazuya Oda, Asaka (JP)

(73) Assignee: Fuji Photo Film, Co, Ltd., Kanagawa (JP)

( * ) Notice: Subject to any disclaimer, the term of this patent is extended or adjusted under 35 U.S.C. 154(b) by 0 days.

(21) Appl. No.: 09/434,465

(22) Filed: Nov. 5, 1999

(30) Foreign Application Priority Data

Nov. 6, 1998 (JP) ............................................ 10/315648

(51) Int. Cl.⁷ ........................... H04N 5/335; H04N 3/14
(52) U.S. Cl. ........................ 348/273; 348/322; 348/312
(58) Field of Search ................................ 348/273, 294, 348/311, 312, 314, 315, 316, 317, 319, 320, 322, 220.1

(56) References Cited

U.S. PATENT DOCUMENTS

| | | | | |
|---|---|---|---|---|
| 5,396,290 A | * | 3/1995 | Kannegundla et al. | 348/312 |
| 5,880,781 A | * | 3/1999 | Udagawa et al. | 348/279 |
| 6,342,921 B1 | * | 1/2002 | Yamaguchi et al. | 348/322 |
| 6,426,493 B1 | * | 7/2002 | Oda | 348/322 |
| 6,452,634 B1 | * | 9/2002 | Ishigami et al. | 348/322 |
| 6,496,224 B2 | * | 12/2002 | Ueno | 348/322 |
| 6,519,000 B1 | * | 2/2003 | Udagawa | 348/322 |
| 6,529,236 B1 | * | 3/2003 | Watanabe | 348/317 |
| 6,583,818 B1 | * | 6/2003 | Toma | 348/312 |
| 2002/0118291 A1 | * | 8/2002 | Ishigami et al. | 348/311 |

FOREIGN PATENT DOCUMENTS

| | | |
|---|---|---|
| JP | A5-176236 | 7/1993 |
| JP | A7-298141 | 11/1995 |
| JP | B22660594 | 6/1997 |

* cited by examiner

*Primary Examiner*—Aung Moe
(74) *Attorney, Agent, or Firm*—Birch, Stewart, Kolasch & Birch, LLP.

(57) ABSTRACT

An electronic still camera is provided with timing generators in drive signal generating circuitry which are selected to generate various timing signals in accordance with a mode set by mode selection. Two vertical drivers generate substrate potentials defining the signal charge capacity of photosensitive cells. In accordance with the mode set, a system controller feeds a mode adaptive selector with a control signal. In response to the mode signal, the mode adaptive selector selects an output from one of the vertical drivers. From the one vertical driver, the photosensitive cells are fed with a predetermined voltage higher than usual as the substrate potential. An image signal obtained is amplified by a signal processing circuit provided in the following stage.

15 Claims, 14 Drawing Sheets

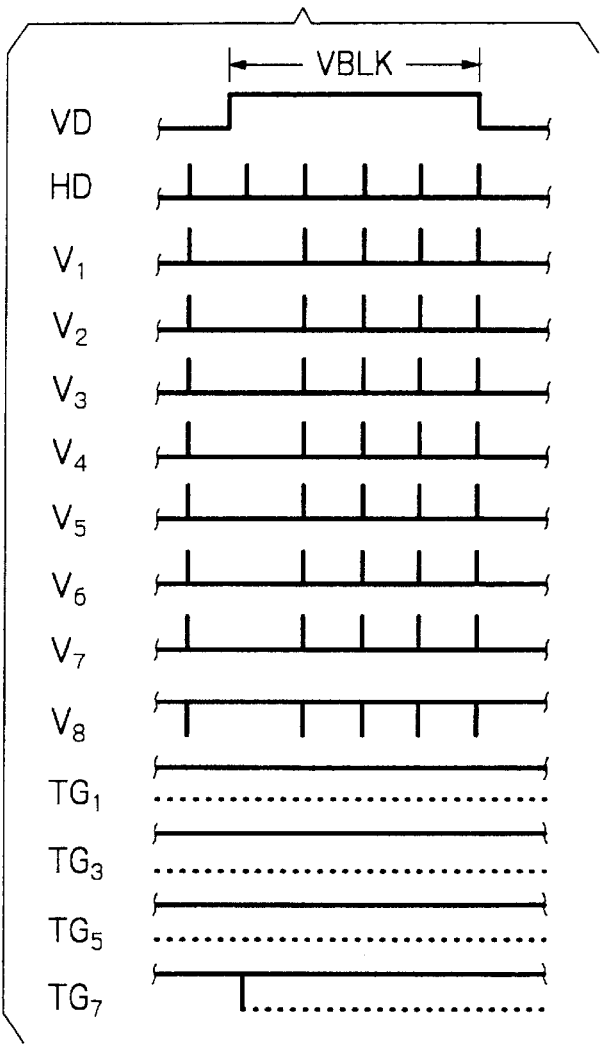

SOLID-STATE IMAGE PICKUP APPARATUS FREE FROM LIMITATIONS ON THIN-DOWN READING IN A FOUR-FIELD INTERLINE TRANSFER SYSTEM AND METHOD OF READING SIGNALS OUT OF THE SAME

BACKGROUND OF THE INVENTION

1. Field of the Invention

The present invention relates to a solid-state image pickup apparatus free from limitations on thin-down reading in a four-field interline transfer system, and a method of reading signals out of the same. More particularly, the present invention relates to a four-field interline transfer type solid-state image pickup apparatus capable of picking up high definition images and advantageously applicable to, e.g., an electronic still camera or a video camera.

2. Description of the Background Art

A high definition TV (television) system dealing with images about two times higher in vertical resolution than images available with the current TV broadcasting system has recently been proposed. Also, electronic still cameras improved in vertical resolution are presently under development. An electronic still camera with improved vertical resolution uses interline transfer type photosensitive devices or cells doubling the number of pixels in the vertical direction and allowing all of its pixels to be read out by four consecutive times of field scanning. Japanese patent No. 2660594, for example, discloses an electronic still camera using photosensitive cells forming a great number of pixels and freeing reproduced images from flicker and other defects.

The prerequisite with an electronic still camera is, of course, that an image be recorded with high definition. On the other hand, high vertical resolution is not necessary when an image is displayed on the conventional electronic viewfinder, LCD (Liquid Crystal Display) or similar display. For this kind of display, it is necessary to thin down lines in the vertical direction for a power saving purpose, among others.

Further, there is an increasing demand for an electronic still camera with a greater number of pixels, smaller pixel size, and lower drive voltage for shooting. However, an electronic still camera meeting such a demand would further lower the amount of signal charge capable of being stored in the individual photosensitive cell. It is well known that when extraordinary intense light or similar unusual light is incident to any one of such photosensitive cells, a signal charge exceeding the charge storing capacity of the photosensitive cell overflows the device and turns out a false signal referred to as blooming. To solve the blooming problem, each photosensitive cell may be provided with an overflow drain for absorbing the false signal in a substrate. While this kind of structure improves the above situation to a significant degree, it sacrifices the photosensitive area and therefore sensitivity of the individual photosensitive cell. Japanese patent laid-open publication Nos. 176236/1993 and 29814/1995 each propose a method of reducing false signals by signal processing without lowering the sensitivity of the photosensitive cells.

The four-field interline transfer type photosensitive cells mentioned earlier each are caused to output a signal charge to a vertical transfer path via a transfer gate by field-by-field scanning (field shift). The vertical transfer path sequentially transfers the signal charge vertically in accordance with a vertical drive signal. The vertical transfer path has a capacity designed to accommodate a signal charge output from at least one photosensitive cell. To read out the entire pixels with the above type of photosensitive cells, the field scanning is repeated four times. Consequently, a time for reading out the signal charge in an image pickup period of time increases with an increase in the number of pixels and lowers an image refreshing rate. For example, in a monitor mode for displaying a scene on the electronic viewfinder of an electronic still camera before a shot, it may occur that an image appearing on the viewfinder is not coincident with the actual scene. This renders the camera inconvenient to use. Moreover, when color filters for separating the colors of incident light are arranged in a Bayer pattern, not all of three primary colors R (red) G (green) and B (blue) can be output line by line even if the lines are read out during a field time.

Assume that signals are read out of the above photosensitive cells while being thinned down in order to display a desirable image in, e.g., the monitor mode. Then, two fields of signal charges are transferred to the vertical transfer paths at a time. However, the transfer capacity available with each vertical transfer path is substantially one half of the amount of signal charge to be read out and is therefore short at the time of thin-down reading. It follows that thin-down reading is limited in the four-field interline transfer system.

SUMMARY OF THE INVENTION

It is therefore an object of the present invention to provide a solid-state image pickup apparatus free from limitations on thin-down reading in, e.g., the four-field interline transfer system.

A solid-state image pickup apparatus of the present invention includes an image pickup section. The image pickup section includes, optics for focusing incident light representative of a scene, a color separating section for separating the colors of light incident via the optics, a plurality of photosensitive cells each for transforming light incident via the color separating section to a corresponding signal charge, a plurality of vertical transfer paths each transfers the signal charges fed from adjoining ones of the photosensitive cells in the direction of columns, signal reading circuitry for selecting the reading of the signal charges from the photosensitive cells to the vertical transfer paths, and a horizontal transfer paths for transferring the signal charges fed from the vertical transfer paths in the direction of rows. A mode setting section selects and sets one of a plurality of modes each matching with a particular usage of the signal charges output from the photosensitive cells. A drive signal generating section generates drive signals to be fed to the photosensitive cells, vertical transfer paths, signal reading circuitry and horizontal transfer path for outputting signals representative of a single picture in a plurality of fields in accordance with the mode set by the mode setting section. A controller controls the drive signal generating section in accordance with the output of the mode setting section. An amplifying circuit amplifies the outputs of the image pickup section. The drive signal generating section includes a plurality of timing signal generating circuits each for generating signals for transferring the signal charges in the direction of columns by a particular number of phases corresponding to the mode set, a first potential feeding circuit for controlling a substrate potential determining the signal charge capacity of each photosensitive cell to a first preselected potential, a second potential feeding circuit for causing the substrate potential to rise to a second preselected potential higher than the first preselected potential, and an output selecting circuit for selecting, under the control of the controller, the outputs of one of the timing signal generating circuits, first potential feeding circuit and second potential feeding circuit in accordance with the mode set.

Also, a signal reading method using an interline transfer system for sequentially reading out, in accordance with drive signals, signal charges produced by photoelectric conversion of incident light representative of a scene by repeating a field shift, a transfer in the direction of columns and a transfer in the direction of rows to thereby transform an image represented by the signal charges to a color image higher in definition than an image available with the standard broadcasting system of the present invention begins with a step of selectively setting a first shoot mode for generating the color image having high definition or a second shoot mode for generating the image available with the standard broadcasting system. Control signals matching with the first shoot mode or the second shoot mode set are generated. Drive signals for the field shift, transfer in the direction of columns and transfer in the direction of rows are generated in accordance with the control signals. A plurality of photosensitive cells for generating the signal charges are prepared. Drive signals are generated for reducing, in the second shoot mode, the saturation capacity of each photosensitive cell to one-third or one-half of a saturation capacity particular to the first shoot mode, and the drive signals matching with the mode set are selected. The incident light is converted to the signal charges. When a plurality of field shifts are effected at the same time, there is selected the drive signals capable of maintaining a preselected distance between transfer elements to be read matching with the mode selected. The signal charges transferred to the above transfer elements are transferred in the direction of columns. The transfer in the direction of columns is repeated to transfer the signal charges line by line, and then the signal charges are transferred in the direction of rows. Finally, signals output by the transfer in the horizontal direction are amplified.

BRIEF DESCRIPTION OF THE DRAWINGS

The objects and features of the present invention will become more apparent from the consideration of the following detailed description taken in conjunction with the accompanying drawings in which:

FIG. 4 is a timing chart representative of a relation between various signals generated by the drive signal generating circuitry of FIG. 3;

FIGS. 5A–5D are timing charts showing the timings of signals output from a V driver included in the circuitry of FIG. 3 and a potential;

DESCRIPTION OF THE PREFERRED EMBODIMENTS

Briefly, a solid-state image pickup apparatus of the present invention is directed toward high-definition image pickup practicable with the four-field interline transfer system. The apparatus is characterized in that to make up for the short capacity of each vertical transfer path in a thinning mode, the apparatus adjusts a substrate potential in accordance with the degree of thinning and then amplifies the resulting signals. Even when signal charges are shifted from photosensitive devices or cells by field shift in the thinning mode, the short transfer capacity of each vertical transfer path is obviated. The above amplification prevents the dynamic range of the resulting signals from being lowered.

Figure 1:
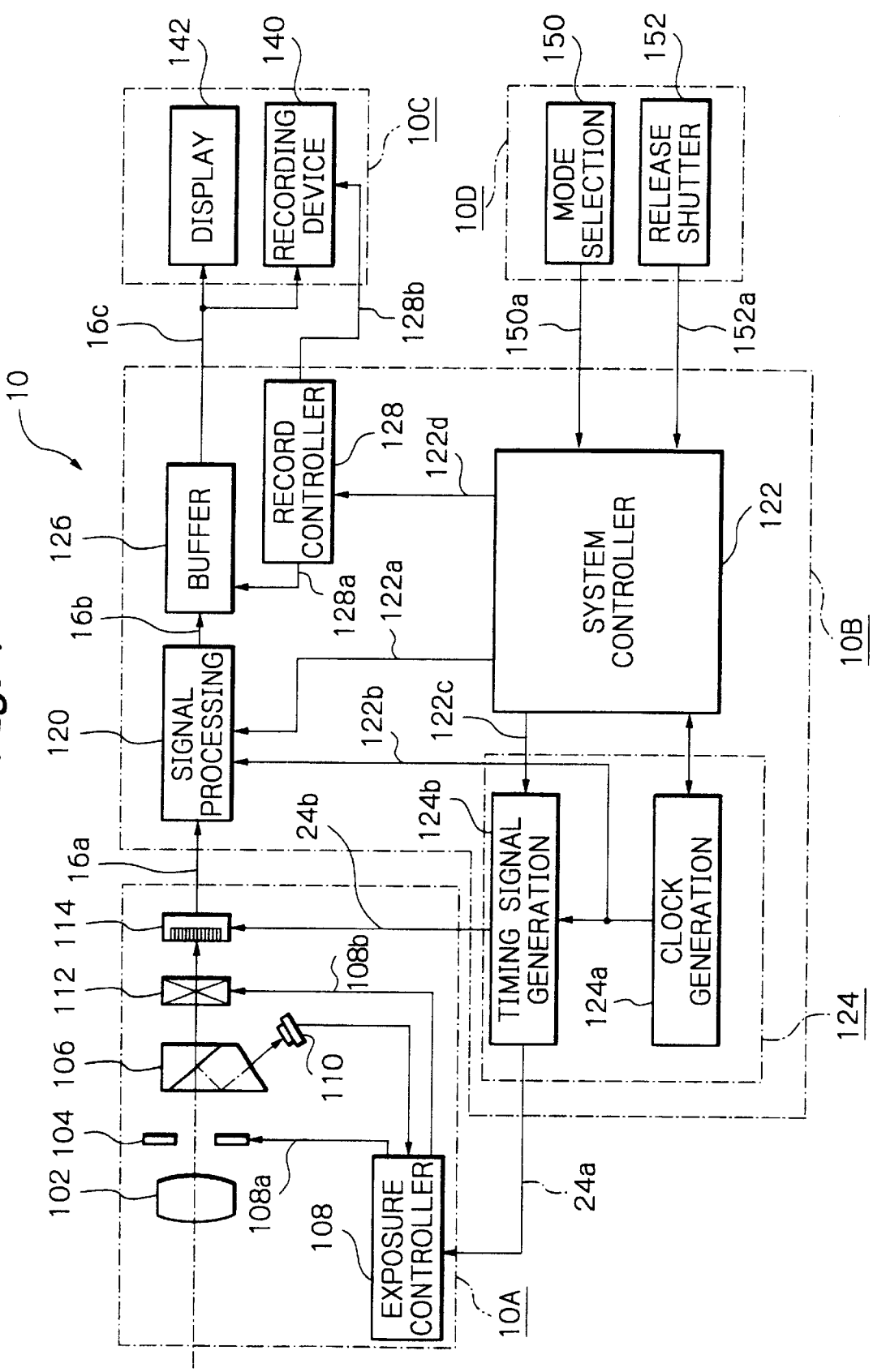
FIG. 1 is a block diagram schematically showing solid-state image pickup apparatus embodying the present invention.

Referring to FIG. 1 of the drawings, a solid-state image pickup apparatus embodying the present invention is shown and implemented as an electronic still camera by way of example. It is to be noted that FIG. 1 does not show the structural elements of the camera not relevant to the understanding of the present invention. As shown, the camera, generally 10, is generally made up of an image pickup section 10A, a signal processing section 10B, a signal output section 10C, and a mode setting section 10D.

The image pickup section 10A includes a lens 102, a stop mechanism 104, a beam splitter 106, an exposure controller 108, a light quantity sensor 110, a shutter mechanism 112, and an image pickup unit 114. The lens 102 focuses light incident thereto and representative of a scene on the photosensitive surface of the image pickup unit 114. The stop mechanism 104 adjusts the quantity of an incident light beam under the control of the exposure controller 108. More specifically, the stop mechanism 104 adjusts the circular sectional area of the light beam in accordance with an aperture.

The beam splitter 106 splits the light beam restricted by the stop mechanism 104 into two parts. One part of the split beam is incident to the light quantity sensor 110 while the other part of the same is incident to the shutter mechanism 112. The light quantity sensor 110 is a photosensitive device for measuring the quantity of light output from the beam splitter 106, i.e., the photometric value of a scene including a desired subject. The photometric value is delivered to the exposure controller 108. In a photometry mode which will be described specifically later, the quantity of light may be directly determined on the basis of a preshoot signal output from the image pickup unit 114 in place of the above photometric value. The use of the preshoot signal would make the beam splitter 106 and light quantity sensor 110 needless and would thereby reduce the number of parts of the camera 10.

The exposure controller 108 controls the stop mechanism 104 and shutter mechanism 112 in accordance with the output 24a of drive signal generating circuitry 124 which will be described later specifically. Specifically, the exposure controller 108 calculates an exposure on the basis of a photometric value output from the light quantity sensor 110 and delivers control signals 108a and 108b to the stop mechanism 104 and shutter mechanism 112, respectively. In response, the stop mechanism 104 and shutter mechanism 112 respectively set up an aperture and a shutter speed for implementing the calculated exposure. The exposure controller 108 operates under the control of a system controller 122 which will be described specifically later.

Figure 2:
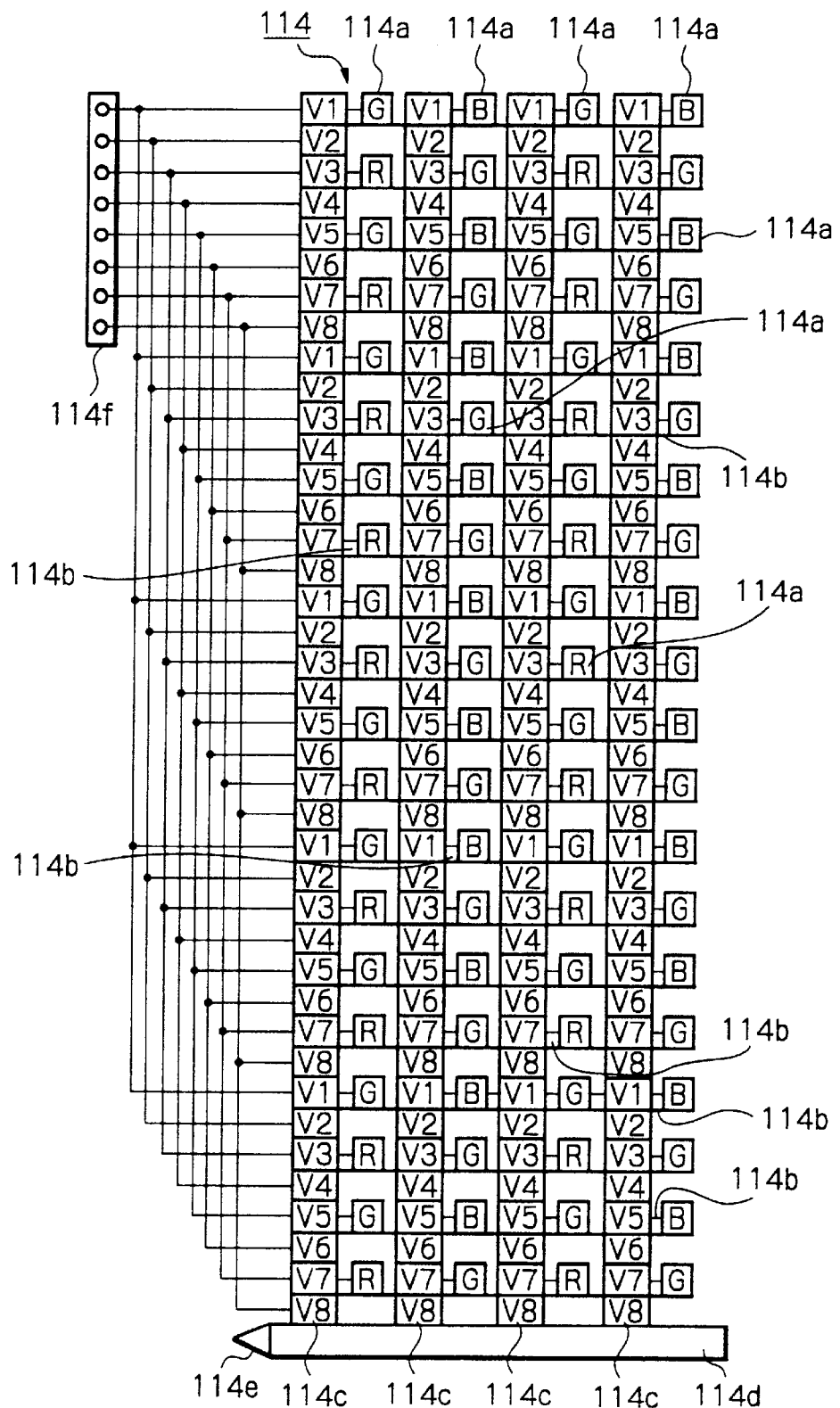
FIG. 2 is a schematic view showing a specific configuration of an image pickup section included in the illustrative embodiment.

FIG. 2 shows a specific configuration of the image pickup unit 114. As shown, the image pickup unit 114 has photosensitive devices (cells) or photoelectric transducers 114a arranged bidimenationally in rows and columns on its photosensitive surface. The photosensitive cells 114a each transform light incident thereto via the shutter mechanism 112 to a corresponding signal charge or electric signal. Color filters, not shown, each are positioned in front of one of the photosensitive devices 114a in the direction of light incidence. The color filters corresponding one-to-one to the photosensitive cells 114a are implemented as a single plate and separate the colors of incident light, e.g., three primary colors R, G and B. As a result, the R, G and B components of incident light are selectively input to the photosensitive cells 114a, as indicated by letters R, G and B in FIG. 2 specifically. The specific arrangement of the R, G and B color filters shown in FIG. 2 is generally referred to as a Bayer arrangement.

As also shown in FIG. 2, the image pickup unit 114 includes an electrode portion 114f having a plurality of electrodes. The drive signal generating circuitry 124 feeds drive signals 24b to the electrodes of the electrode portion 114f. The drive signals 24b selectively drive the image pickup unit 114 vertically or horizontally at designated one of different timings, as will be described in detail later. Two transfer elements 114c for the vertical transfer of a signal charge are associated with each of the photosensitive cells 114a, as illustrated, and implemented by CCDs (Charge Coupled Devices). A transfer gate or signal read gate 114b is formed between each photosensitive cell 114a and the vertical transfer element 114c adjoining it in order to prevent a signal charge 16a (see FIG. 1) stored in the cell 114a from leaking. The transfer gate 114b has a switch opening and closing function, i.e., transfers the signal charge 16a from the associated photosensitive cell 114a to the adjoining vertical transfer element 114c when the gate 114b receives a field shift pulse via an electrode. The vertical transfer elements 114c are arranged in vertical arrays, as illustrated, and constitute vertical transfer paths for sequentially transferring signal charges read out of the photosensitive cells 114a vertically, i.e., in the direction of columns. The vertical transfer paths will also be labeled 114c hereinafter. The signal charges 16a sequentially shifted line by line along the vertical transfer paths 114c are handed over to a horizontal transfer path 114d extending horizontally, i.e., in the direction of rows. The horizontal transfer path 114d, implemented by an array of transfer elements, outputs the signal charges 16a to the signal processing section 10B via an amplifier 114e in accordance with the drive signals 24b.

Referring again to FIG. 1, the signal processing section 10B includes a signal processing 120, a buffer 126 and a record controller 128 in addition to the system controller 122 and drive signal generating circuitry 124 mentioned earlier. The drive signal generating circuitry 124 is made up of a clock generation 124a and a timing signal generation 124b. The signal processing 120 converts the analog signals, or signal charges, 16a output from the image pickup 114 to digital data in accordance with a control signal 122a and a clock signal 122b output from the system controller 122 and clock generation 124a, respectively. The signal processing 120 executes white balance adjustment, gamma correction, aperture correction and other various conventional processing with the digital data and then executes signal processing in accordance with a mode selected on a mode selection 150 included in the mode setting section 10D. Two different modes are available with the illustrative embodiment, i.e., a still picture shoot mode for recording at least a still picture picked up in a recording device 140 included in the signal output section 10C and a movie mode for simply displaying a scene in the form of a movie on a display 142 also included in the signal output section 10C.

The system controller 122 indicates the signal processing 120 the mode selected on the mode selection 150 by sending the control signal 122a thereto. In response, the signal processing 120 executes preselected modulation with the processed signals in the still picture shoot mode or amplifies the level of the signals in the movie mode. Why the signal processing 120 amplifies the signal level in the movie mode is that the amplitude of image signals output in the movie mode is limited, compared to image signals output in the still picture shoot mode. This will be describe more specifically later. The amplification substantially equalize the levels of image signals output in the two different modes. Further, in the still picture shoot mode, the signal processing 120 transforms the image signals 16a output from the image pickup unit 114 to recordable video signals by modulation. The signal processing 120 feeds to the buffer 126 only signals 16b matching with the mode selected. Of course, before controlling the signal processing 120 with the control signal 122a, the system controller 122 controls the timing signal generation 124b with a control signal 122c to implement video signals matching with the mode selected.

The system controller 122 controls the entire camera 10. The system controller 122 determines a mode selected in response to a signal input from the mode setting section 10D and controls the drive signal generating circuitry 124 and record controller 128 in accordance with the mode.

In the drive signal generating circuitry 124, the clock generation 124a generates a synchronizing signal 122b based on an original oscillation clock which is generated to cause the camera 10 to operate with, e.g., the current broadcasting system or a high definition broadcasting system. Specifically, the clock generation 124a generates a high frequency signal for a high definition broadcasting system as a reference clock and generates a clock for the current broadcasting system by dividing the frequency of the reference clock or independently of the reference clock. The synchronizing signal 122b is fed from the clock generation 124a to the timing signal generation 124b while being fed to the signal processing 120 as the clock signal 122b.

The timing signal generation 124b generates timing signals for causing the signal charges 16a to be read out of the image pickup unit 114 and generates the drive signals 24b based on the timing signals. The timing signals include vertical drive signals for driving the vertical transfer paths 114c, FIG. 2, horizontal drive signals for driving the horizontal transfer path 114d, FIG. 2, and timing signals for effecting the field shift of the signal charges 16a. In addition, the timing signal generation 124b generates a synchronizing signal (or a timing signal) 24a for controlling the operation of the exposure controller 108. Assume that the system controller 122 feeds a control signal 122c representative of the movie mode to the timing signal generation 124b. Then, the timing signal generation 124b causes, e.g., the overflow-drain voltage (OFD) or substrate voltage of the individual photosensitive cell 114a to rise in accordance with the degree of thinning down, as will be described specifically later.

The buffer 126 amplifies the amplitude of the video signals 16b received from the signal processing 120. The record controller 128 generates control signals 128a and 128b on the basis of a timing control signal 122d fed from the system controller 122. The control signals 128a and 128b are input to the buffer 126 and the recording device 140 of the signal output section 10C, respectively.

In the signal output section 10C, the recording device 140 includes a magnetic recording medium, semiconductor memory for use in, e.g., a memory card, optical or magnetooptical recording medium or similar recording medium not shown. The video signals 16c input to the recording device 140 are written to the recording medium. The recording device 140 is capable of causing the display 142 to display the input video signals 16c or the video signals 16c read out of the recording medium. When the recording medium is removable from the recording device 140, it may be removed and mounted to an apparatus for reproducing and displaying the video signals or printing them out.

In the mode setting section 10D, the mode selection 150 allows any one of various modes relating to the recording and display of a picture, e.g., the still picture shoot mode, movie mode or photometry mode to be input thereon. The mode selection 150 feeds information 150a representative of the mode selected to the system controller 122. When the operator of the camera 10 turns on a power switch, not shown, provided on the camera 10 and then selects an operation for displaying a picture on the display 142, the mode selection 150 automatically sets up the movie mode. When the operator presses a shutter button, not shown, also provided on the camera 10, the release shutter 152 feeds a signal 152a indicative of an image reading timing to the system controller 122. At the same time, the release shutter 152 indicates the system controller 122 the change of mode from the movie mode to the still picture shoot mode (as well as its timing).

Figure 3:
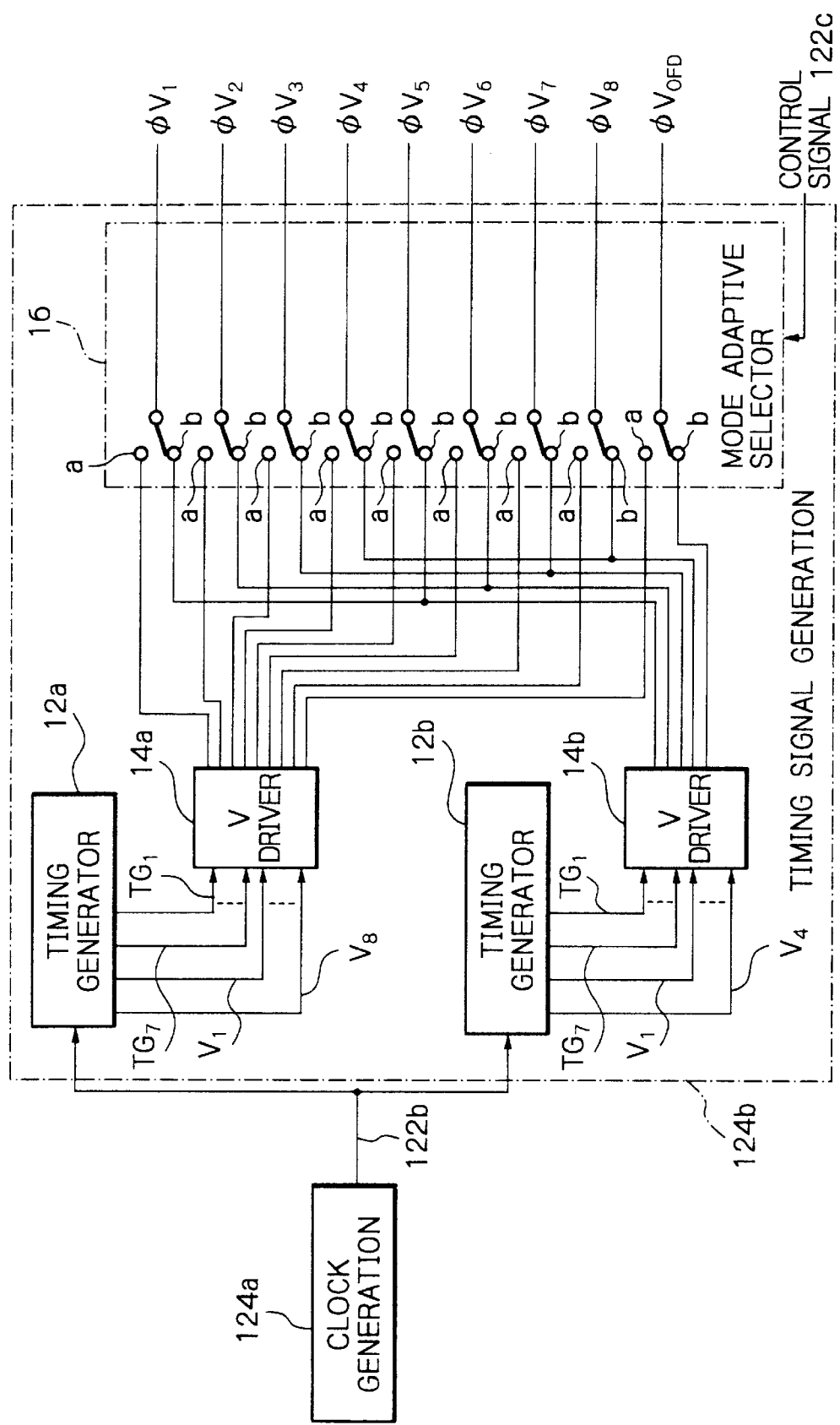
FIG. 3 is a schematic block diagram showing a specific configuration of drive signal generating circuitry included in the illustrative embodiment.

Reference will be made to FIG. 3 for describing the drive signal generating circuitry 124 more specifically. As shown, the synchronizing signal 122b is fed from the clock generation 124a to the timing signal generation 124b. The timing signal generation 124b includes timing generators 12a and 12b, V (vertical) drivers 14a and 14b, and a mode adaptive selector 16. The timing generator 12a and V driver 14a cooperate to generate drive signals for the still picture mode. Likewise, the timing generator 12b and V driver 14b cooperate to generate drive signals for the movie mode.

Synchronizing signals VD and HD (see FIG. 4) are fed to each of the timing generators 12a and 12b. The timing generator 12a outputs, based on the synchronizing signals VD and HD, vertical timing signals $V_1$–$V_8$ and transfer gate timing signals $TG_1$, $TG_3$, $TG_5$ and $TG_7$. In addition, the timing generator 12a outputs a horizontal timing signal, a reset signal, and a timing signal representative of the duration of a shot over which the OFD voltage determining the potentials of signal charges to be stored in the photosensitive cells 114a, FIG. 2, should be fed. The timing generator 12b outputs, based on the signals VD and HD, vertical timing signals $V_1$–$V_4$ and transfer gate timing signals $TG_1$, $TG_3$, $TG_5$ and $TG_7$ as well as the other various signals mentioned above in relation to the timing generator 12a. The outputs of the timing signal generator 12a and the outputs of the timing signal generator 12b are applied to the V drivers 14a and 14b, respectively. In response, the V drivers 14a and 14b each output drive signals, or vertical transfer pulses, $\phi V_1$–$\phi V_8$ and an $\phi_{OFD}$ voltage OFD and deliver them to the mode adaptive selector 16. The drive signals $\phi V_1$–$\phi V_8$ each selectively have one of three different potentials, i.e., a low potential, a medium potential, and a high potential.

The control signal 122c output from the system controller 122 is input to the mode adaptive selector 16 and causes it to select the drive signals $\phi V_1$–$\phi V_8$ matching with the still picture shoot mode or the movie mode selected. Specifically, the drive signals $\phi V_1$–$\phi V_8$ output from the V driver 14a assigned to the still picture shoot mode are input to terminals a included in the selector 16. The drive signals $\phi V_1$–$\phi V_4$ output from the V driver 14b assigned to the movie mode each are input to two terminals b also included in the selector 16, thereby implementing the drive signals $\phi V_1$–$\phi V_8$. The image pickup unit 114 causes its various portions to operate in accordance with the drive signals $\phi V_1$–$\phi V_8$ selected by the selector 16.

The drive signal generating circuitry 124 having the above configuration will be operated as follows. Assume that the signal charges 16a are read out of the image pickup unit 114 in the still picture shoot mode by the four-field interlace system. FIG. 4 shows, in the time domain of the synchronizing signal VD, a relation between the synchronizing signals VD and HD, the vertical timing signals $V_1$–$V_8$ and the transfer gate timing signals $TG_1$, $TG_3$, $TG_5$ and $TG_7$ holding in the above condition. As shown, when the first synchronizing signal HD is input during the vertical blanking period VBLK of the synchronizing signal VD, a field shift occurs. At this instant, the vertical timing signals $V_1$–$V_7$ are held in a high level, but only the vertical timing signal $V_8$ is held in a low level in order to prevent vertical transfer from occurring. Further, the timing generator 12a maintains only the transfer gate timing signal $TG_7$ in a low level.

FIGS. 5A–AD show the above relation in more detail by enlarging the time domain of the synchronizing signal HD. As shown, on the elapse of a preselected period of time since the synchronizing signal HD has gone high (FIG. 5A), the transfer gate timing signal $TG_7$ goes low and remains low for a preselected period of time $t_g$ (FIG. 5B). The transfer gate timing signal $TG_7$ of low level is fed to the V driver 14a. In response, the V driver 14a sends a field shift pulse FS (FIG. 5C) to the transfer gate 114b of the vertical transfer path 114c, FIG. 2, to which the signal $TG_7$ is assigned. As a result, the transfer gate 114b is turned on over the duration of the field shift pulse FS. As shown in FIG. 5D, when the transfer gate 114b is turned on, its potential drops and forms a potential well to thereby remove a barrier between the photosensitive cell 114a and the associated vertical transfer element. Consequently, the signal charge generated in the photosensitive cell 114a migrates to the vertical transfer element 114c via the transfer gate 114b. Because the field shift pulse FS is applied to all of the transfer gates 114b to which the signal $TG_7$ is assigned, signal charges are fed from one row of photosensitive cells 114a to the adjoining vertical transfer paths 114c in the repetitive R and G pattern.

As for the subsequent three consecutive fields, the transfer gate timing signals $TG_5$, $TG_3$ and $TG_1$ sequentially go low at the same timing as the above transfer gate timing signal TG$_7$, although not shown specifically. Consequently, signal charges are sequentially fed from three rows of photosensitive cells 114a associated with the transfer gate timing signals TG$_5$, TG$_3$ and TG$_1$ to the vertical transfer paths 114c.

Figure 6:
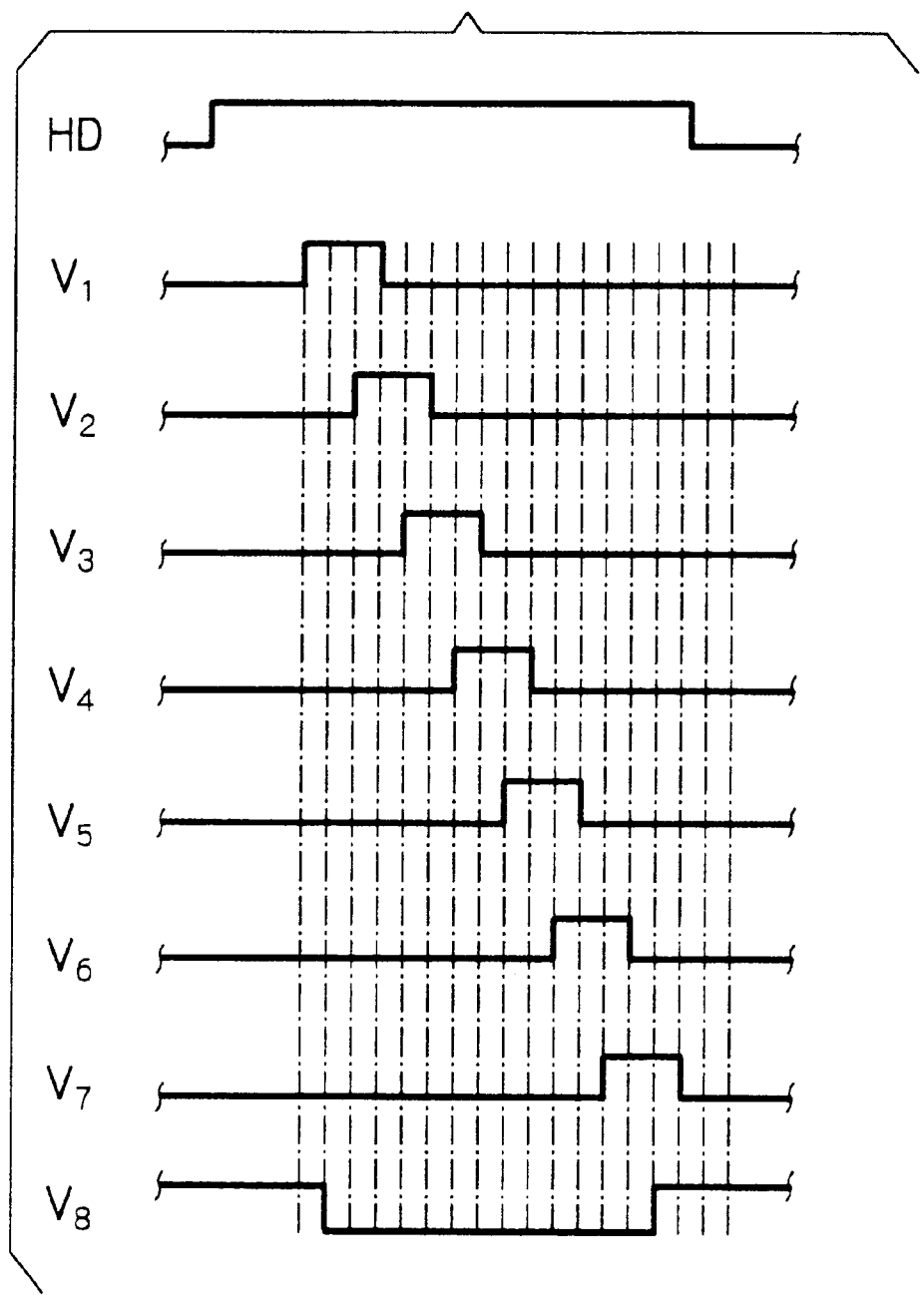
FIG. 6 is a timing chart representative of a relation between vertical timing signals output from the circuitry of FIG. 3 and used in a still picture shoot mode.

In each field, the signal charges read out of the photosensitive cells 114a are transferred in the vertical direction. In the still picture shoot mode, the illustrative embodiment effects the vertical transfer by eight-phase drive. Specifically, the timing generator 12a generates the vertical timing signals V$_1$–V$_8$, as shown in FIG. 6 specifically together with the synchronizing signal HD. Considering the previously stated condition for forming a potential well, the vertical timing signals V$_1$–V$_8$ each allow a signal charge to be stored when in a low level. In the specific condition shown in FIG. 6, seven or six of the signals V$_1$ and V$_8$ allow signal charges to be stored. Stated another way, in eight-phase drive, at least six of eight transfer elements can contribute to the vertical transfer.

Figure 7:
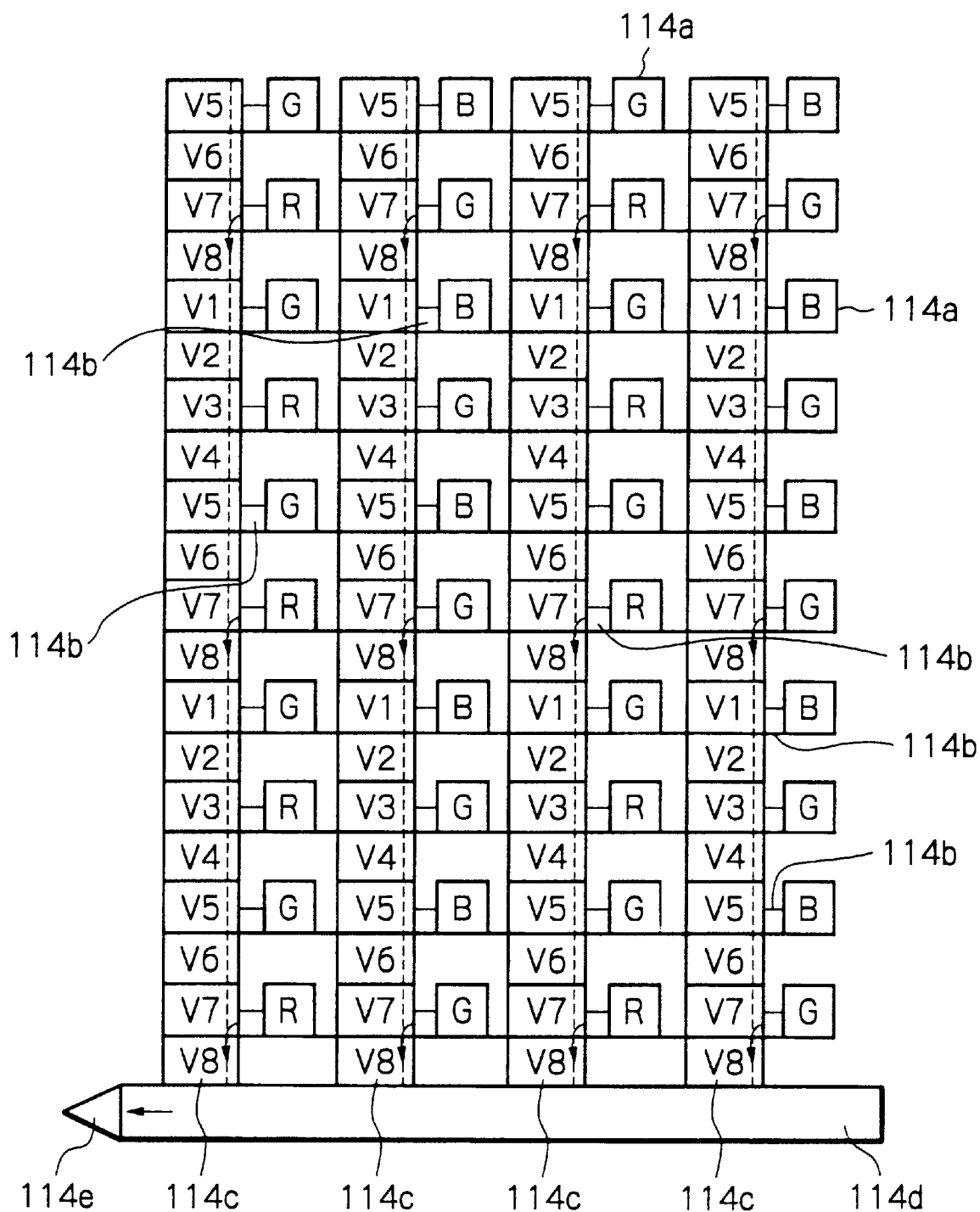
FIGS. 7–10 are schematic views demonstrating how the illustrative embodiment effects field shifts with signal charges derived from incident light in the still picture shoot mode and transfers the signal charges.
Figure 8:
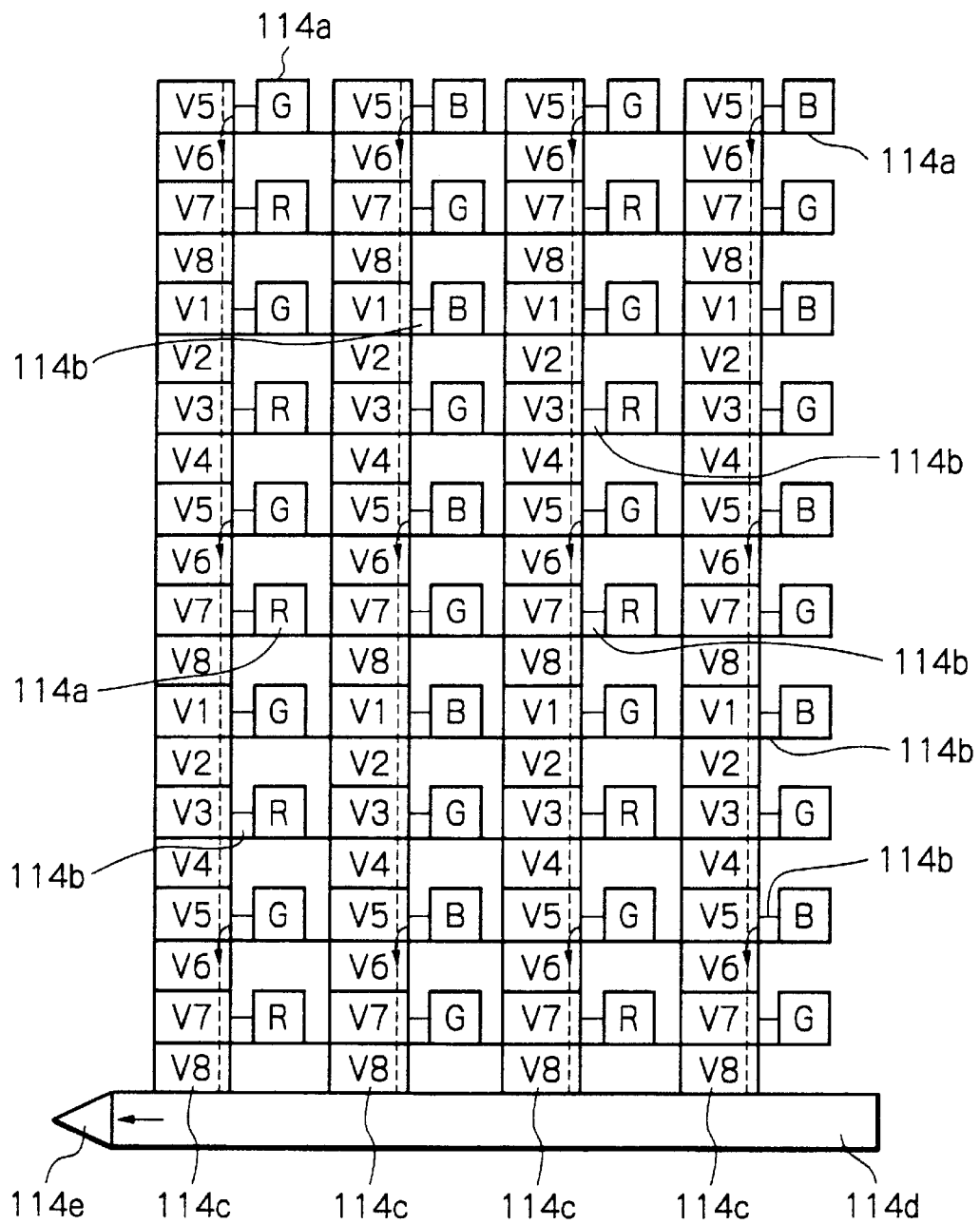
Figure 9:
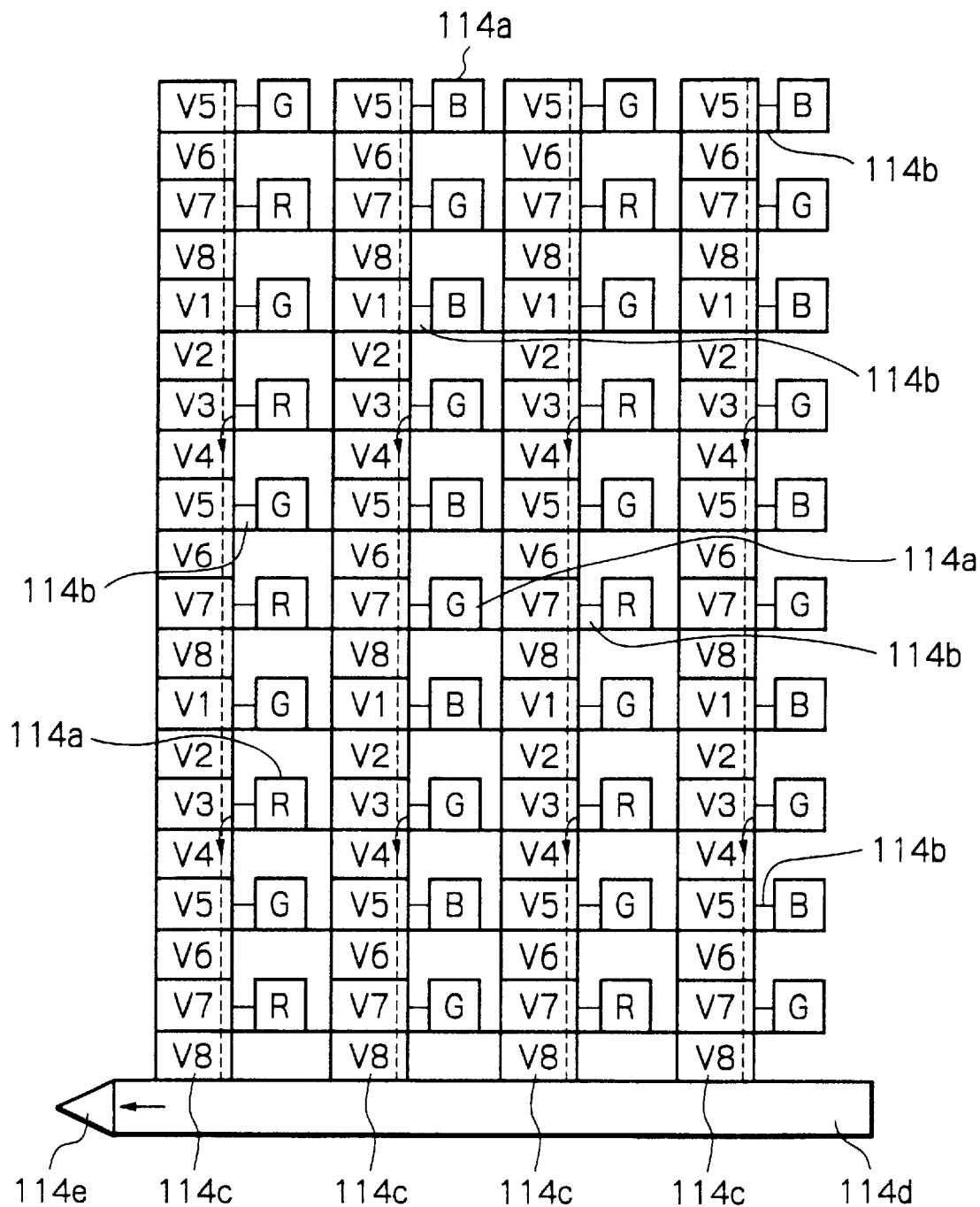
Figure 10:
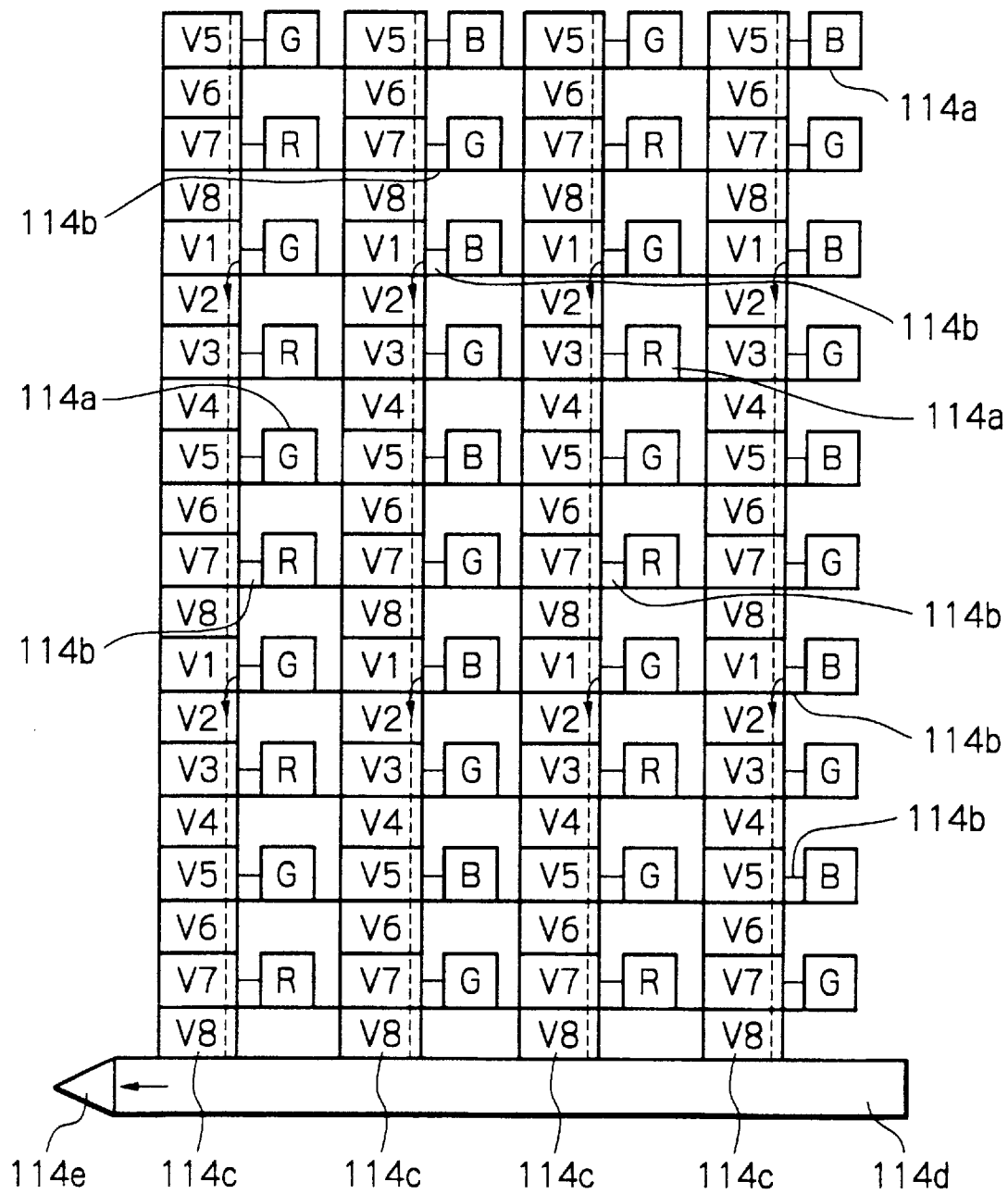

As stated above, in the still picture shoot mode, the signal charges 16a transferred from the photosensitive cells 114a by the field shift are vertically transferred within a field time by eight-phase drive. As shown in FIG. 7, the signal charges 16a brought to the horizontal transfer path 114d by the vertical transfer are sequentially output via the amplifier 114e in accordance with the horizontal timing signal. In the subsequent three fields, the signal charges 16a associated with the electrodes V$_5$, V$_3$ and V$_1$ are sequentially transferred in the vertical direction and then in the horizontal direction and output via the amplifier 114e, as shown in FIGS. 8–10. In this manner, all the pixels or cells are read by four consecutive times of drive.

The signals or signal charges 16a read out of the image pickup unit 114 are fed to the signal processing 120 and subjected to the previously stated various kinds of processing thereby. The signals 16b output from the signal processing 120 are delivered to the signal output section 140 via the buffer 126. The recording device 140 writes the signals 16c in its recording medium in accordance with the control signal 128b output from the record controller 128. The display 142 may display a picture represented by the signals 16c for a preselected period of time. The display 142 may display even a monotone picture in response to the operation of the release shutter 152, if desired.

Figure 11:
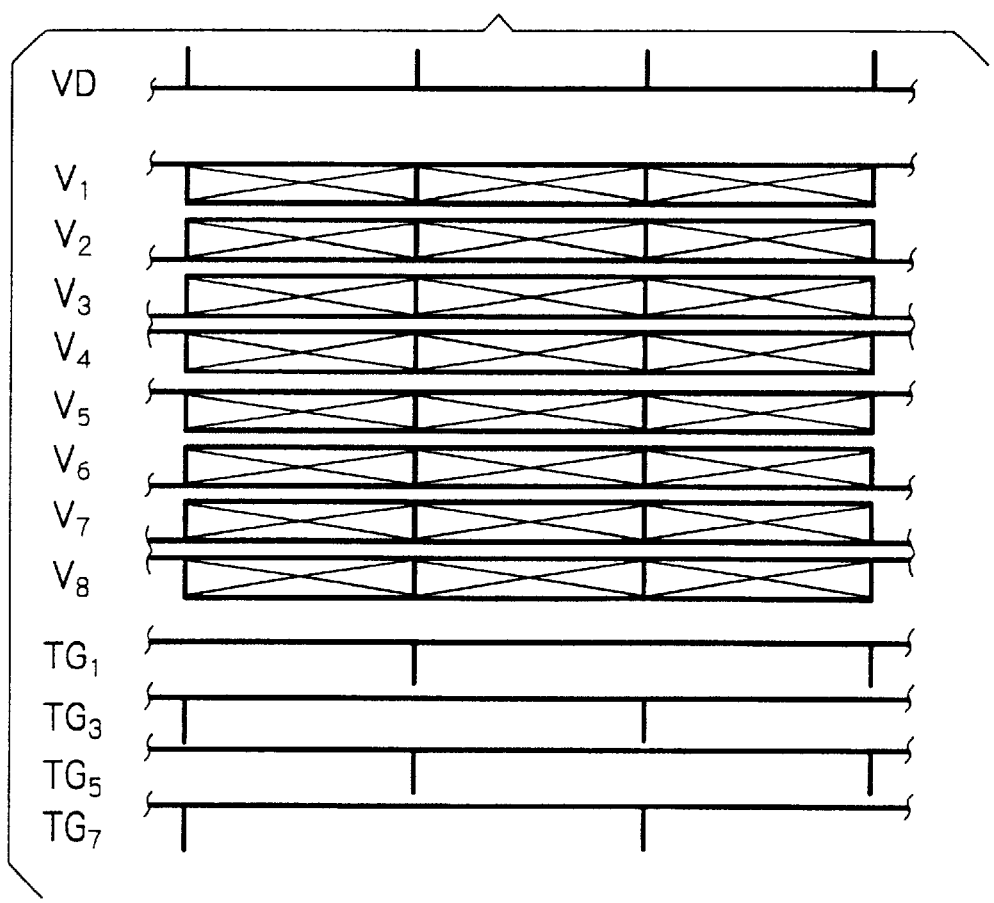
FIG. 11 is a timing chart representative of field shifts which the illustrative embodiment effects in a movie mode.

Assume that the signal charges 16a are read out of the image pickup unit 114 in the movie mode, as distinguished from the above still picture shoot mode, by the four-field interlace system. In the movie mode, while the synchronizing signals VD and HD are held in the relation shown in FIG. 4, the timing generator 12b feeds to the V driver 14b the vertical timing signals V$_1$–V$_4$ for implementing four-phase drive two times longer in period than eight-phase drive. As shown in FIG. 11, the vertical timing signals V$_1$–V$_4$ are substituted for the vertical timing signals V$_5$–V$_8$. For this purpose, the outputs of the V driver 14b each are fed to two terminals b of the mode adaptive selector 16, as stated earlier with reference to FIG. 3.

As shown in FIG. 11, the timing signal generator 12b outputs the transfer gate timing signals TG$_1$ and TG$_5$ and the transfer gate timing signals TG$_3$ and TG$_7$ as a first and a second group, respectively. This allows signal charges to be simultaneously read out at two positions in a single field. Stated another way, eight transfer elements forming each vertical transfer path 114c are divided into two groups by four-phase drive. By reading out two signal charges in a single field, it is possible to read out all of the pixels within a period of time corresponding to two fields. That is, four-phase drive allows all of the pixels to be read out by way of the transfer to the vertical transfer paths 114c within a period of time (two fields) which is one half of the period of time (four fields) particular to eight-phase drive. Let this kind of signal reading be referred to as thinning down to one half. The signal charges fed to the vertical transfer paths 114c are sequentially transferred in the vertical direction toward the horizontal transfer path 114d in synchronism with the vertical timing signals V$_1$–V$_4$ and V$_5$–V$_8$ shown in FIG. 12.

Figure 12:
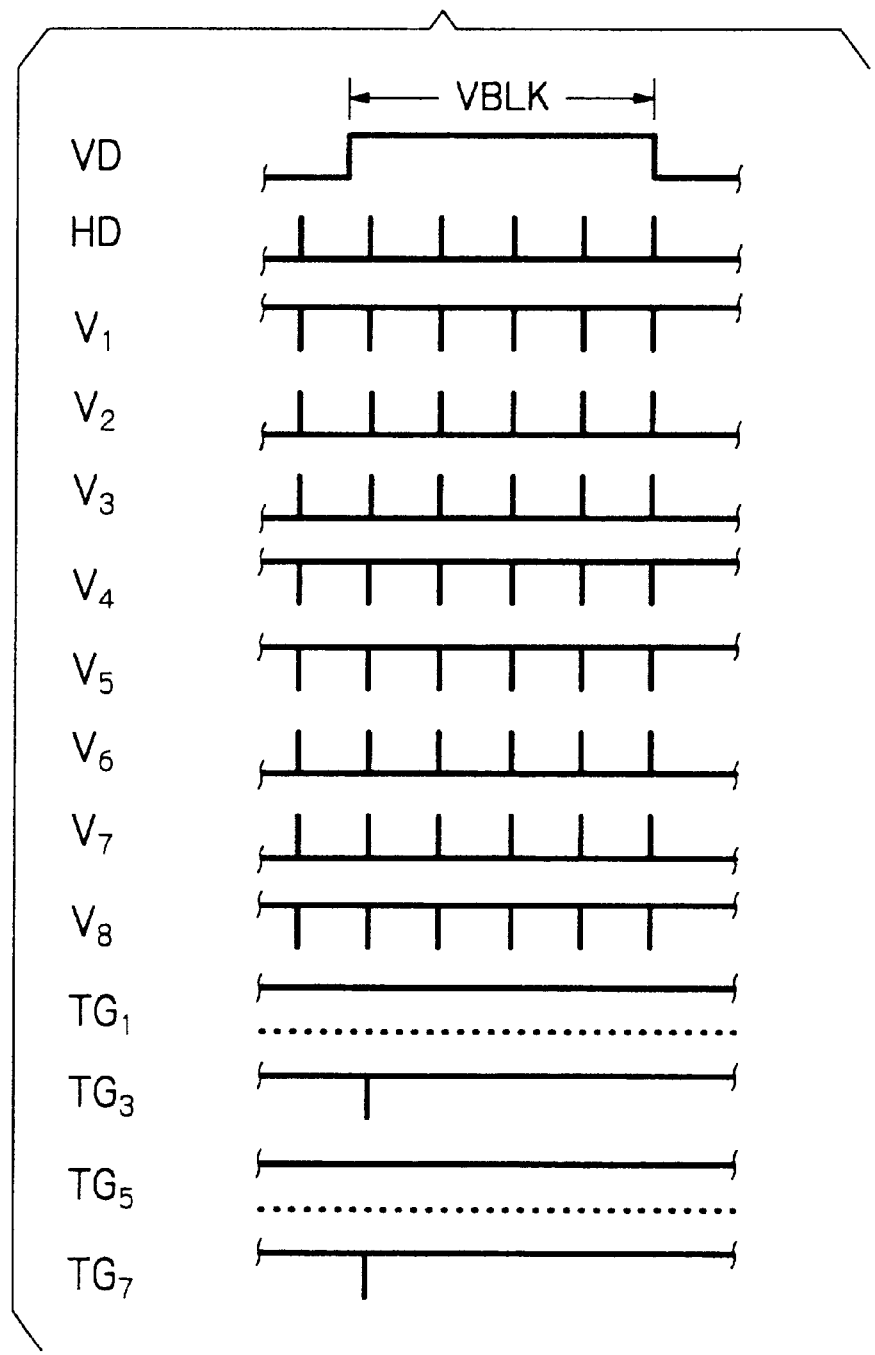
FIG. 12 is a timing chart showing, in an enlarges scale, part of a synchronizing signal, vertical timing signals and transfer gate timing signals of FIG. 11 in the time domain.
Figure 13:
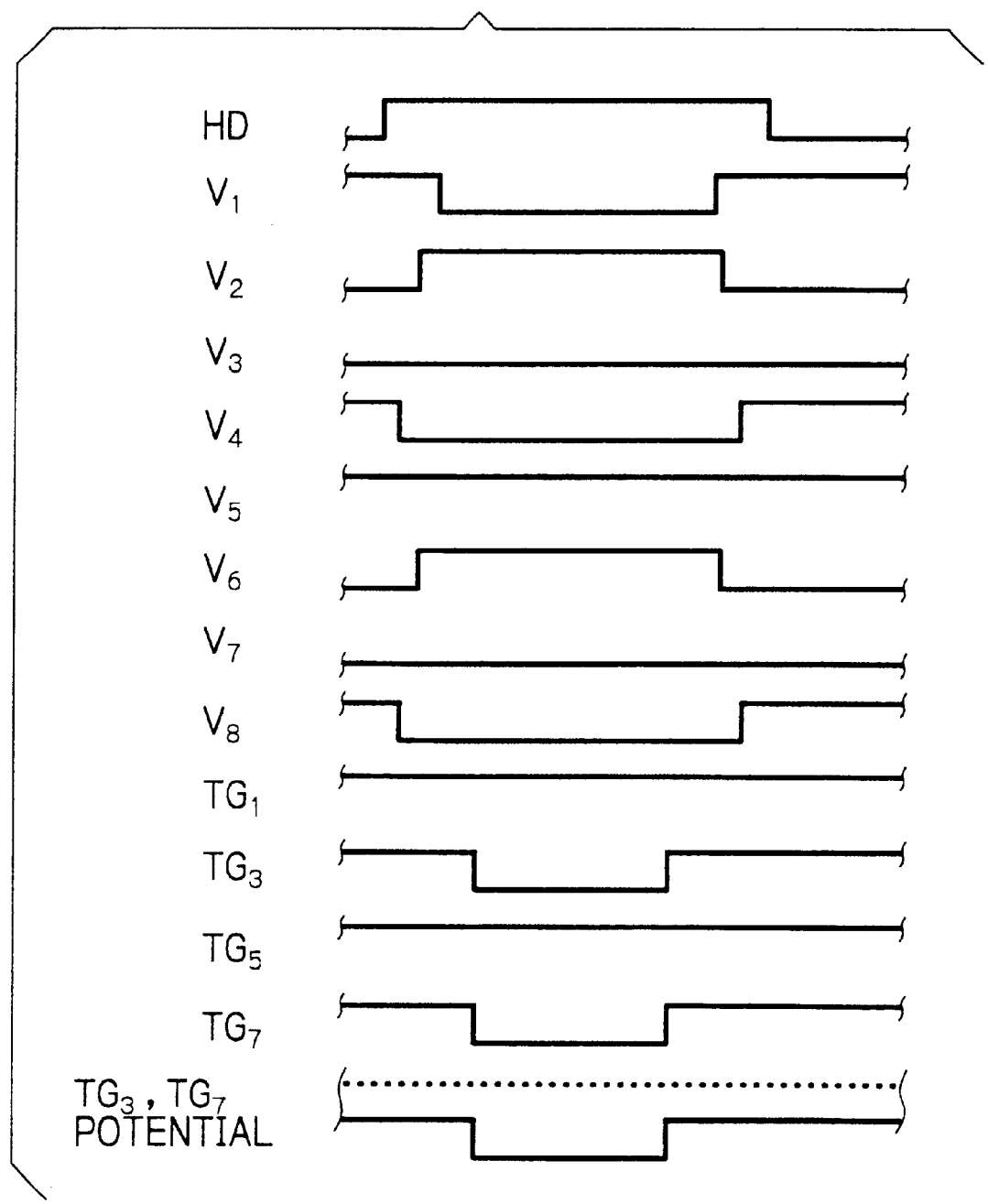
FIG. 13 is a timing chart showing, in an enlarged scale, part of the synchronizing signal, vertical timing signals and transfer gate timing signals of FIG. 12 in the time domain together with a generated potential.

FIG. 13 shows the transfer gate timing signals TG$_3$ and TG$_7$ of FIG. 12 in an enlarged scale together with the other signals. As shown, when the signals TG$_3$ and TG$_7$ both are in a low level (ON state), the timing signal generator 12b maintains the vertical timing signals in a low level. The resulting potential is shown at the bottom of FIG. 13.

Figure 14:
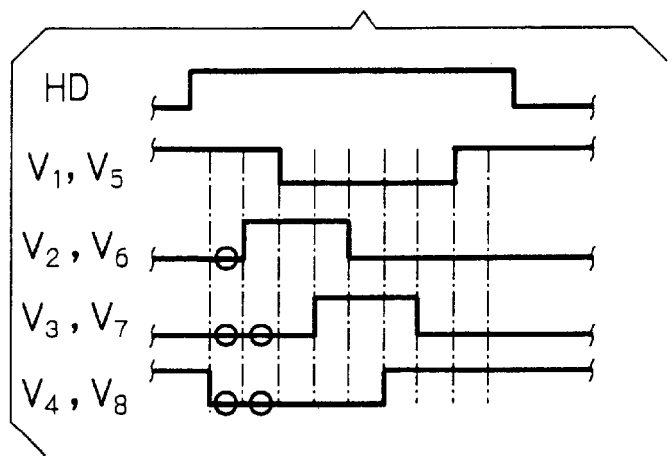
FIG. 14 is a timing chart showing a relation between vertical timing signals for four-phase drive output, in the movie mode, from a timing generating circuit included in the illustrative embodiment.

FIG. 14 shows a relation between the vertical timing signal groups V$_1$ and V$_5$, V$_2$ and V$_6$, V$_3$ and V$_7$ and V$_4$ and V$_8$ usually holding in the four-phase drive condition. Considering the condition for forming a potential well, the vertical timing signals V$_1$–V$_4$ allow signal charges to be stored when in a low level, as will be seen from the description of eight-phase drive. In the specific condition shown in FIG. 14, three or two of the vertical timing signals V$_1$–V$_4$ allow signal charges to be stored (see positions indicated by circles). It follows that four-phase drive allows at least two of four transfer elements to contribute to the storage of signal charges. Four-phase drive, however, reduces the signal charge storing capacity of each vertical transfer path 114c up to one-third of the capacity available with eight-phase drive at maximum.

Figure 15A:
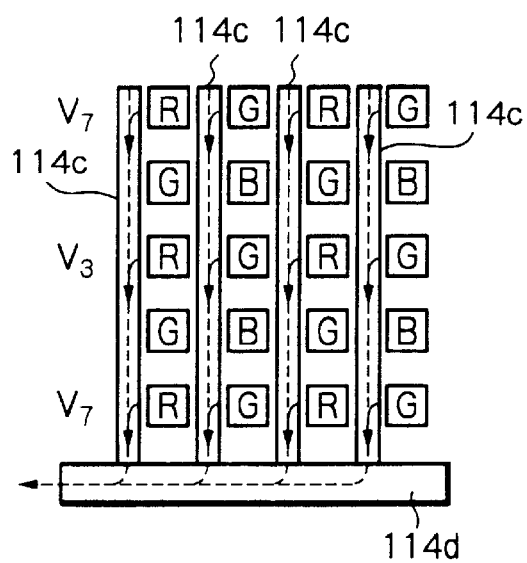
FIGS. 15A and 15B are schematic views demonstrating how the illustrative embodiment effects field shifts with the signal charges in the movie mode and effects vertical and horizontal transfer of the signal charges.

Considering the above decrease (one-third) in the storing capacity of each vertical transfer path 114c ascribable to fourphase drive, the OFD voltage $\phi_{OFD}$ output from the V driver 14b is so adjusted as to reduce the storing capacity of the individual photosensitive cell 114a to about one-third to one-half of the capacity available in eight-phase drive at maximum. This successfully prevents the signal charges transferred from the photosensitive cells 114a from overflowing the vertical transfer paths 114c. For example, assume that the transfer gate timing signals TG$_3$ and TG$_7$ are brought to an ON state first. Then, as shown in FIG. 15A, signal charges are transferred to the vertical transfer elements to which the vertical drive signals V$_3$ and V$_7$ corresponding to the vertical timing signals are fed. In FIG. 15A, such vertical transfer elements are designated by the same references as the vertical timing signals. By this field shift, signal charges relating to the same colors (R and G in FIG. 15A) are fed to the entire vertical transfer paths 114c. These signal charges are transferred toward the horizontal transfer path 114d by four-phase drive. The signal charges fed from the vertical transfer paths 114c to the horizontal transfer path 114d are sequentially output line by line in synchronism with the horizontal drive signals.

Figure 15B:
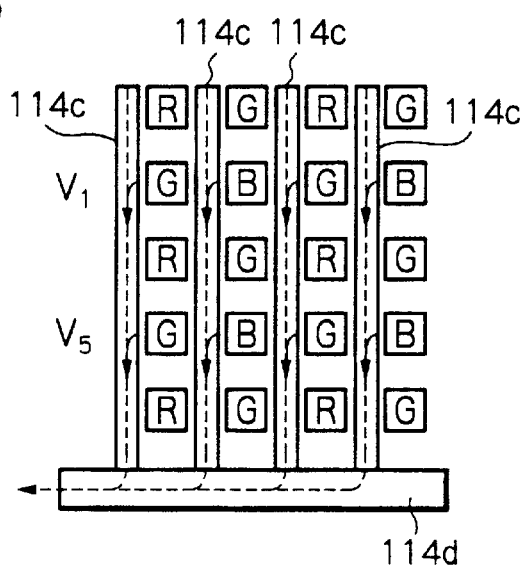

As shown in FIG. 15B, in the next field, only the transfer gate timing signals TG$_1$ and TG$_5$ are brought to an ON state. This will be seen from the relation shown in FIG. 11. As a result, signal charges relating to the same colors G and B are fed to the entire vertical transfer paths 114c. These signal charges are also transferred to the horizontal transfer path 114d and then output line by line. As for a single field, the signal charges to be read out are thinned down to one-half, i.e., the signal reading time is halved.

The image signals output in the above movie mode are different in dynamic range from the image signals output in the still picture shoot mode because the signal charge storing capacity of the individual photosensitive cell 114a is reduced to one-third to one-half at maximum, as stated earlier. In light of this, the signal processing 120 doubles or triples the level of the image signals 16a output from the image pickup unit 114, thereby providing the signals 16a with the original level. For this purpose, the signal processing 120 may include a 6 dB amplifying circuit.

Figure 16A:
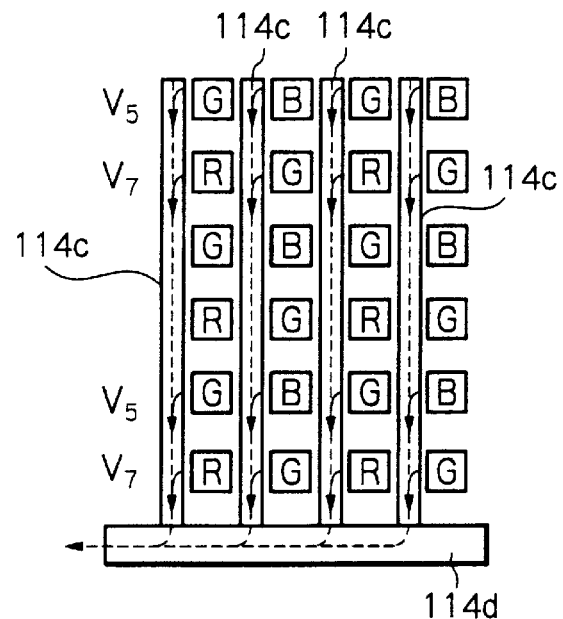
FIGS. 16A and 16B are schematic views demonstrating a specific modification of the field shift and vertical and horizontal transfer shown in FIGS. 15A and 15B.
Figure 16B:
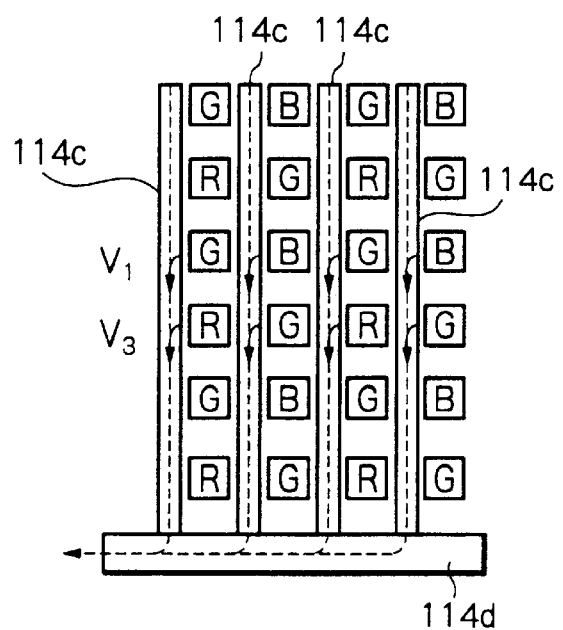

The signal charge reading sequence shown and described is only illustrative and may be modified in some different ways, as follows. FIGS. 16A and 16B show a specific modified sequence. As shown in FIG. 16A, only the transfer gate timing signals $TG_5$ and $TG_7$ are brought to an ON state first during field shift. Then, as shown in FIG. 16B, only the transfer gate timing signals $TG_1$ and $TG_3$ are brought to an ON state during the next field shift. If desired, only the field shift shown in FIG. 16A or the field shift shown in FIG. 16B may be repeated. In any case, all the three primary colors R, G and B can be read out in a single field.

As stated above, despite the four-field interlace system, the electronic still camera 10 shifts two fields of signal charges in a single field and transfers them vertically. As a result, the signal charges are read out as if they were thinned down to one half. The signal charge storing capacity of the photosensitive cells 114a is so adjusted as to prevent the signal charges from exceeding the storing capacity of the vertical transfer paths 114c and overflowing the paths 114c at the time of the field shift. While such adjustment lowers the dynamic range of image signals output from the image pickup unit 114, the image signals are amplified to guarantee a dynamic range in the movie mode. The camera 10 can therefore display a high quality picture corresponding to a movie in consideration of the arrangement of color filters despite that it thins down the signals to one half in the four-field interlace system.

The entire disclosure of Japanese patent application No. 315648/1998 filed Nov. 6, 1998 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus comprising:
   an image pick-up section comprising:
   optics for focusing incident light representative of a scene;
   a color separating section for separating colors of light incident via said optics;
   a plurality of photosensitive cells each for transforming light incident via said color separating section to a corresponding signal charge;
   a plurality of vertical transfer paths each for transferring, in a direction of columns, signal charges fed from adjoining ones of said plurality of photosensitive cells;
   signal reading circuitry for selecting reading of the signal charges from said plurality of photosensitive cells to said plurality of vertical transfer paths; and
   a horizontal transfer path for transferring, in a direction of rows, the signal charges fed from said plurality of vertical transfer;
   a mode setting section for selecting and setting one of a plurality of modes each matching with a particular usage of the signal charges output from said plurality of photosensitive cells;
   a drive signal generating section for generating drive signals to be fed to said plurality of photosensitive cells, said plurality of vertical transfer paths, said signal reading circuitry and said horizontal transfer path for outputting signals representative of a single picture in a plurality of fields in accordance with the mode set by said mode setting section;
   a controller for controlling said drive signal generating section in accordance with an output of said mode setting section; and
   an amplifying circuit for amplifying outputs of said image pickup section;
   said drive signal generating section comprising:
   a plurality of timing signal generating circuits each for generating signals for transferring the signal charges in the direction of columns by a particular number of phases corresponding to the mode set;
   a first potential feeding circuit for controlling a substrate potential determining a signal charge capacity of each of said plurality of photosensitive cells to a first preselected potential;
   a second potential feeding circuit for causing said substrate potential to rise to a second preselected potential higher than said first preselected potential; and
   an output selecting circuit for selecting, under a control of said controller, outputs of one of said plurality of timing signal generating circuits, said first potential feeding circuit and said second potential feeding circuit in accordance with the mode set.

2. An apparatus in accordance with claim 1, wherein said image pickup section uses an interline transfer system and assigns at least four fields to a single picture.

3. An apparatus in accordance with claim 2, wherein said color separating section comprises a plurality of color filters for separating the incident light into three primary colors R (red), G (green) and B (blue) and arranged in any one of a Bayer pattern, a G stripe, RB checker pattern, and a G stripe, RB full checker pattern.

4. An apparatus as claimed in claim 3, wherein said plurality of vertical transfer paths each comprise transfer elements each two of which adjoin one of said plurality of photosensitive cells, and a plurality of electrodes for operating various portions of said image pickup section in accordance with said drive signals, wherein said drive signal generating section generates said drive signals two times greater in number than or equal in number to said plurality of fields, and wherein said second potential feeding circuit feeds a substrate potential reducing a saturation capacity of said plurality of photosensitive elements to one-third or one-half of a saturation capacity available with said first potential feeding circuit.

5. An apparatus in accordance with claim 1, wherein said color separating section comprises a plurality of color filters for separating the incident light into three primary colors R (red), G (green) and B (blue) and arranged in any one of a Bayer pattern, a G stripe, RB checker pattern, and a G stripe, RB full checker pattern.

6. An apparatus as claimed in claim 1, wherein said plurality of vertical transfer paths each comprise transfer elements each two of which adjoin one of said plurality of photosensitive cells, and a plurality of electrodes for operating various portions of said image pickup section in accordance with said drive signals, wherein said drive signal generating section generates said drive signals two times greater in number than or equal in number to said plurality of fields, and wherein said second potential feeding circuit feeds a substrate potential reducing a saturation capacity of said plurality of photosensitive elements to one-third or one-half of a saturation capacity available with said first potential feeding circuit.

7. A signal reading method using an interline transfer system for sequentially reading out, in accordance with drive signals, signal charges produced in a plurality of photosensitive cells by photoelectric conversion of incident light representative of a scene by repeating a field shift, a transfer in a direction of columns and a transfer in a direction of rows to thereby transform an image represented by said signal charges to a color image higher in definition than an image available with a standard broadcasting system, said signal reading method comprising the steps of:

(a) selectively setting a first shoot mode for generating the color image having high definition or a second shoot mode for generating the image available with the standard broadcasting system;

(b) determining which of said first shoot mode and said second shoot mode is set, and generating control signals matching with the mode set;

(c) selectively generating first drive signals having a first phase relationship with each other for the field shift, the transfer in the direction of columns and the transfer in the direction of rows in accordance with said control signals, second drive signals having a second phase relationship with each other, different from the first phase relationship, for reducing, in said second shoot mode, a saturation capacity of each of said plurality of photosensitive cells to one-third or one-half of a saturation capacity particular to said first shoot mode, and matching with the mode set;

(d) converting the incident light to the signal charges;

(e) generating, when a plurality of field shifts are effected at the same time, field shift signals contained in one of the first and second drive signals, which is selectively generated, for maintaining a preselected distance between transfer elements to be read matching with the mode set;

(f) transferring the signal charges transferred to said transfer elements in said step (e) in the direction of columns;

(g) repeating said step (f) for transferring the signal charges line by line and then transferring said signal charges in the direction of rows; and (h) amplifying signals output in said step (g).

8. A method in accordance with claim 7, wherein said step (c) comprises the steps of:

(i) generating the one of the first and second drive signals, which is selectively generated, at a particular timing matching with the mode selected for the field shift, the transfer in the direction of columns, and the transfer in the direction of rows;

(j) setting a particular substrate potential determining the saturation capacity for the mode set; and (k) selecting said drive signals generated in said steps (i) and (j).

9. A method in accordance with claim 8, wherein said step (e) comprises the substep of generating the one of said first and second drive signals, which is selectively generated, in a relation capable of preserving color attributes of outputs produced in said step (d).

10. A method in accordance with claim 9, wherein said step (e) comprises the substep of selecting, in a thinning mode, said second drive signals capable of reading out all of three primary colors in a single field.

11. A method in accordance with claim 10, wherein said step (h) comprises the substep of amplifying the signals by a magnification substantially equal to or more than a number of fields assigned to a thinning mode.

12. A method in accordance with claim 7, wherein said step (e) comprises the substep of generating the one of said first and second drive signals, which is selectively generated, in a relation capable of preserving color attributes of outputs produced in said step (d).

13. A method in accordance with claim 12, wherein said step (e) comprises the substep of selecting, in a thinning mode, said second drive signals capable of reading out all of three primary colors in a single field.

14. A method in accordance with claim 7, wherein said step (h) comprises the substep of amplifying the signals by a magnification substantially equal to or more than a number of fields assigned to a thinning mode.

15. A method of sequentially reading out, in response to drive signals, signal charges produced in a plurality of photosensitive cells using an interline transfer system by photoelectric conversion of incident light representative of a scene by repeating a field shift, a transfer in a direction of columns and a transfer in a direction of rows to thereby transform an image represented by the signal charges to a color image higher in definition than an image available with a standard broadcasting system, comprising the steps of:

(a) selectively setting a first shoot mode for generating the color image having high definition or a second shoot mode for generating the image available with the standard broadcasting system;

(b) determining which of the first shoot mode and the second shoot mode is set, and generating control signals matching with the mode set;

(c) generating first drive signals having a first phase relationship with each other for the field shift, the transfer in the direction of columns and the transfer in the direction of rows in accordance with said control signals, generating second drive signals having a second phase relationship with each other, different from the first phase relationship, for reducing, in the second shoot mode, a saturation capacity of each of the plurality of photosensitive cells to one-third or one-half of a saturation capacity particular to the first shoot mode, and selecting one of the first and second drive signals which matches with the mode set;

(d) converting the incident light to the signal charges;

(e) generating, when a plurality of field shifts are effected at the same time, field shift signals contained in one of the first and second drive signals, which is selected, for maintaining a predetermined distance between transfer elements to be read matching with the mode set;

(f) transferring the signal charges transferred to the transfer elements in said step (e) in the direction of columns;

(g) repeating said step (f) for transferring the signal charges line by line and then transferring the signal charges in the direction of rows; and (h) amplifying signals output in said step (g).

* * * * *